United States Patent
Germain

(10) Patent No.: US 8,057,155 B2
(45) Date of Patent: Nov. 15, 2011

(54) LIFTING DECK FOR A PALLETIZER

(75) Inventor: Dominique Germain, Octeville-sur-Mer (FR)

(73) Assignee: Sidel Participataions, Octeville-sur-Mer (FR)

( * ) Notice: Subject to any disclaimer, the term of this patent is extended or adjusted under 35 U.S.C. 154(b) by 433 days.

(21) Appl. No.: 12/296,240

(22) PCT Filed: Apr. 3, 2007

(86) PCT No.: PCT/FR2007/000562
§ 371 (c)(1),
(2), (4) Date: Jan. 28, 2009

(87) PCT Pub. No.: WO2007/118988
PCT Pub. Date: Oct. 25, 2007

(65) Prior Publication Data
US 2010/0284775 A1    Nov. 11, 2010

(30) Foreign Application Priority Data
Apr. 4, 2006    (FR) .................................... 06 02926

(51) Int. Cl.
*B65G 57/00* (2006.01)
*B65G 25/00* (2006.01)
(52) U.S. Cl. .................................. 414/794.2; 198/750.1
(58) Field of Classification Search ................ 193/35 A, 193/35 B, 35 R, 35 TE; 198/369.7, 614, 198/750.1, 750.2, 750.4, 765, 774.4, 780, 198/782, 789, 860.1, 860.3, 860.5; 271/190; 384/418–419; 414/400, 416.03, 792, 793.8, 414/794, 794.2, 794.3, 794.8, 799, 907
See application file for complete search history.

(56) References Cited

U.S. PATENT DOCUMENTS

| | | | | |
|---|---|---|---|---|
| 2,391,272 A * | 12/1945 | Rose | ........................... | 193/35 R |
| 2,696,283 A * | 12/1954 | Barry | ........................... | 193/35 R |
| 2,801,730 A * | 8/1957 | Strickler | ...................... | 198/780 |
| 2,960,243 A * | 11/1960 | Beaulieu | ..................... | 414/794.2 |
| 3,111,233 A * | 11/1963 | Raynor | ..................... | 414/789.1 |
| 3,312,320 A * | 4/1967 | Froio | ........................... | 193/35 A |
| 3,612,300 A * | 10/1971 | Berghgracht | ............. | 414/792.2 |
| 3,915,275 A * | 10/1975 | Specht | ........................ | 193/35 R |
| 4,067,456 A | 1/1978 | Schmitt | | |
| 4,232,774 A * | 11/1980 | Gunti | ........................ | 193/35 J |

(Continued)

FOREIGN PATENT DOCUMENTS

| JP | 09255154 A | * | 9/1997 |
|---|---|---|---|
| WO | 2006/000847 A2 | | 1/2006 |

(Continued)

*Primary Examiner* — Gregory Adams
(74) *Attorney, Agent, or Firm* — Sughrue Mion, PLLC

(57) ABSTRACT

The deck for lifting a layer of products (2) onto a pallet (10) is constituted by a sole plate (26) of reduced thickness carried by a frame defined by crosspieces (22) and (23) also of reduced thickness and by side pieces (21). The side pieces (21) are of square-shaped cross-section with at least the horizontal wing (40) thereof being provided so as to receive and enable the locking of a piece of equipment forming said sole plate (26) and which is adapted to the nature of said products (2) constituting the layer to be loaded onto a pallet, said piece of equipment being in the form of tabular components (27) of small diameter, about 30 mm, placed between and parallel to said crosspieces (22), (23), said components (27) being able to constitute fully or partially free rolls (28), or able to be locked.

16 Claims, 1 Drawing Sheet

U.S. PATENT DOCUMENTS

| | | | | |
|---|---|---|---|---|
| 4,434,119 | A | | 2/1984 | Teare |
| 4,558,780 | A | * | 12/1985 | Burkhardt .................. 198/780 |
| 5,054,987 | A | * | 10/1991 | Thornton .................. 414/390 |
| 6,827,545 | B2 | * | 12/2004 | Ward .................. 414/793.4 |
| 2006/0269389 | A1 | * | 11/2006 | Bolzani .................. 414/799 |

FOREIGN PATENT DOCUMENTS

WO    WO 2006000847 A2 *  1/2006

\* cited by examiner

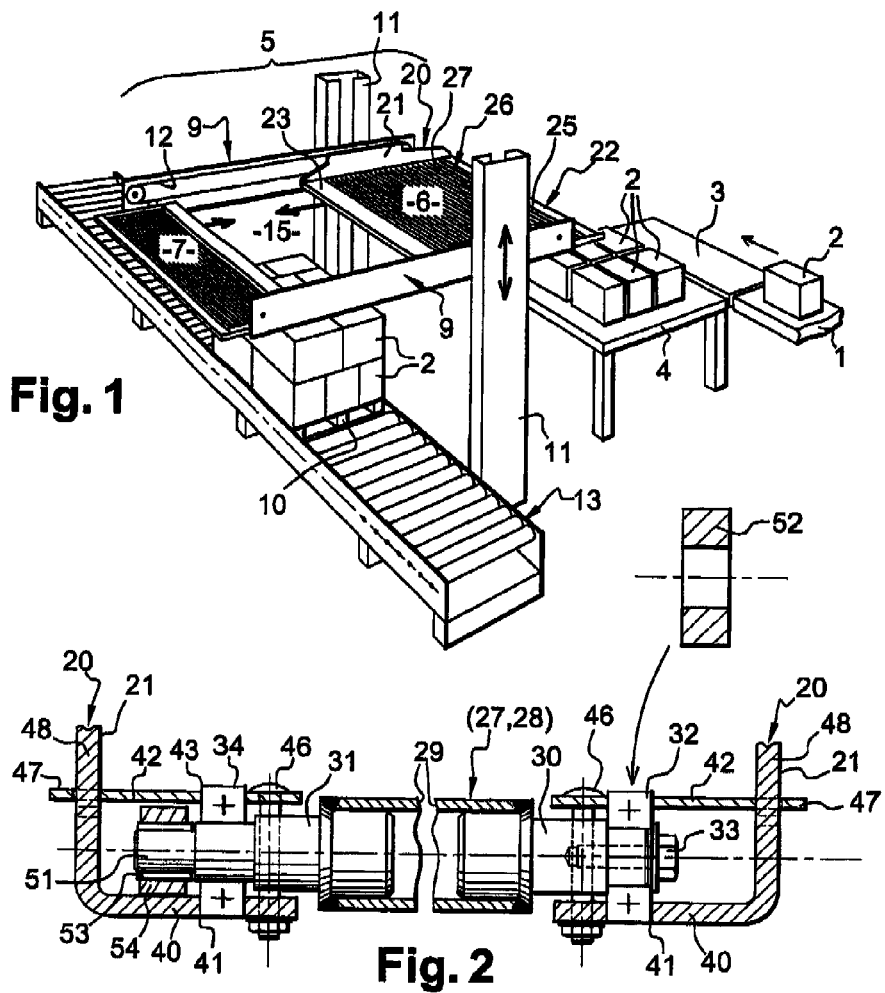
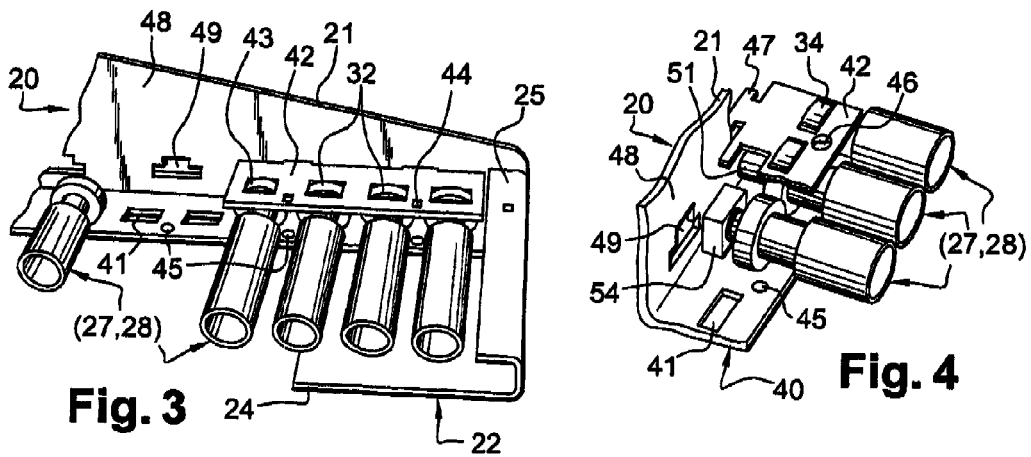

LIFTING DECK FOR A PALLETIZER

CROSS REFERENCE TO RELATED APPLICATION

This application is a National Stage of International Application No. PCT/FR2007/000562 filed Apr. 3, 2007, claiming priority based on French Patent Application No. 06 02926, filed Apr. 4, 2006, the contents of all of which are incorporated herein by reference in their entirety.

FIELD OF THE INVENTION

The present invention relates to palletization installations and in particular, in these installations, the palletization deck, i.e. the deck which allows products to be placed onto a pallet.

DESCRIPTION OF THE PRIOR ART

The palletization process is the conclusion of the manufacturing process of products and it introduces these products into the trading system.

This final operation which takes place in the manufacturing plant is particularly important and also very delicate; failures at this stage are unacceptable in view of the consequences.

In fact, an incident on a pallet can actually damage the whole pallet and even neighbouring pallets, to the point where none of the products are fit for consumption.

Products of all kinds are palletized at the end of their production line. These products are very often placed in parallelepipedic cardboard packages; they can also, in the case of bottles, be grouped into packs.

In all cases, the packages or packaging must be perfectly positioned on the pallet in order to avoid any risk of a fall, for example, but also in order to correctly receive and position the other packages which are alongside or above in the upper layer.

The products most often reach the palletization installation stage by means of a conveyor. They are collected and arranged on a grouping table so as to constitute a layer, which layer extends over a surface which corresponds to that of the pallet.

This layer is then moved and brought on to the palletization deck by means of a pusher and this deck moves in order to position said layer above the pallet to be loaded.

The layer is then centred and encircled vertically to the pallet before being released by the deck which withdraws, and deposits itself, by gravity alone, onto said pallet or onto the layer already in place on the latter.

To limit the drop height of the products onto the pallet or onto the layer already in place, the palletization deck must have as small a thickness as possible.

The dimensions of this deck are substantially greater than that of the pallet and, taking into account the loads that it can receive, of the order of two to three hundred kg, it must also be relatively rigid.

Moreover, this palletization deck must have slip properties which allow a layer of products to be received and released without causing a disturbance, i.e. it is essential that the layer of products retain its shape and its integrity as previously established on the grouping table.

The products are positioned on the grouping table according to a palletization scheme which takes account of their dimensions, in order to best fill all the available space on the surface of the pallet to be loaded.

During their transfer between the grouping table and the palletization deck, the products must retain their position which corresponds to this palletization scheme.

The present invention proposes an original arrangement of this retractable palletization deck which allows it to become a universal-type accessory, i.e. one capable of easily adapting to all types of products and/or packages to be palletized.

In fact, a palletization installation can be used for different types of products and/or packages, the characteristics of which, and in particular the stability but also the slip characteristics, can vary significantly.

It is also useful, even necessary, to be able to modify, according to the nature of the products and/or packages, the properties of the palletization deck in particular by adapting the slip surface of this deck, i.e. the base, to the nature of these products and/or these packages to be palletized.

Generally, the base of this type of deck is constituted by a wooden board treated with resin, forming a kind of board of the "Bakelite" type. The result is thus a relatively rigid base, nevertheless of small thickness, with attractive slip properties.

For certain types of products, such as packs of bottles, the slip-related problems require more careful treatment and the "Bakelite" base can cause unacceptable palletization disturbances and incidents, such as the swivelling of the packs.

The document U.S. Pat. No. 4,067,456 shows a palletizer which comprises a retractable deck able to receive a layer of products, of bagged cement type, and place these bags onto a pallet.

For standard products of bagged cement or cardboard package type, stability problems are practically non-existent. This problem exists principally for products and/or packages of the bottle pack type, i.e. products which have a base, the load-bearing surface area of which is relatively small and which, in addition, is neither homogeneous nor regular.

SUMMARY OF THE INVENTION

The present invention proposes an arrangement of the retractable palletization deck which allows the problems encountered for products and/or packages that are difficult to guide, and not very stable in space, to be remedied. It proposes an arrangement which also offers novel possibilities for dealing with these questions regarding the circulation of the products, and/or packages, on the base of this palletization deck The invention also proposes an arrangement which suits any type of deck: a simple deck constituted by a simple board forming a trap door, as described in the document mentioned above, and equally a more complex deck constituted by two halves of a trap door, of the symmetrical-opening type, as described in the document U.S. Pat. No. 4,434,119.

The palletization deck according to the invention comprises a base of small thickness which is carried on a frame, which frame is delimited by crosspieces also of small thickness and by side pieces, which side pieces have a square-shaped section forming a rebate at least the horizontal wing of which is adjusted to receive and allow the locking of a piece of equipment constituting said base and which is adapted to the nature of the products and/or packages to be palletized, which piece of equipment is in the form of tubular components of small diameter, of the order of 30 mm, arranged between and parallel to said crosspieces, said components being able to constitute rollers which, in whole or in part, are mounted on (a) free wheel(s) to prevent the products from moving backward while the said deck is advancing towards the lifting zone.

According to another provision of the invention, the entry crosspiece of the palletization deck is constituted by a U-shaped structure with asymmetrical wings which are arranged horizontally, the upper wing projecting slightly above the level of the base in order to act as a stop and non-return heel piece.

Still according to the invention, the exit crosspiece of the palletization deck is constituted by a structure in the form of a sheet or profile, the nature and the dimension, taken in the longitudinal direction of said deck, of which are chosen, on the one hand to brake and retain the products and/or packages during their introduction onto said deck and also, on the other hand, to position them correctly during their release onto the pallet.

According to another provision of the invention, the tubular components are constituted by a tube, the length of which corresponds at least to that of the pallet, which tube comprises, at each end, a half-shaft which is fitted with means of the bearing type, able to be set and immobilized in housings which are created in a mounting, which mounting is constituted by the lower horizontal wing of the rebate of the side pieces and at least one locking piece which is parallel to said wing, which piece, or shell, is fixed to said side piece and it is common to several tubular components, forming groups of components, each housing being constituted by two superimposed slots, one in said horizontal wing of said rebate and the other in said tab, to receive, in particular, the outer cage of said means of the bearing type.

Still according to the invention, the rollers comprise a bearing at each of their ends; one of said bearings is immobilized on its half-shaft and the other is axially free, and the half-shaft of the axially free bearing comprises a journal at its end to receive a free wheel of small diameter, which free wheel comprises an outer cage which is immobilized in the rebate of the side piece by means, for example, of a square, which square is fitted with a central orifice which allows it to be force-fitted onto the outer cage of said free wheel.

Still according to the invention, the tubular components can act as retention means in order to brake the items when they reach the end of the deck, which components comprise, instead and in place of the bearing which is immobilized on its half-shaft, a simple one-piece ring of dimensions identical to those of said bearing, which ring is clamped and immobilized on said half-shaft, and it is locked in the housing of the mounting normally allocated to said bearing.

According to another provision of the invention, the fixing shells of the bearings, or of the rings, are constituted by a simple plate which is fitted, on the side of the vertical wing of the side piece, with tabs which fit into slots created in said vertical wing, and which is also fitted with orifices, preferably square, for the passage of machine screws of round-head type which comprise a square under said head.

Still according to the invention, the shells comprise tabs in the form of a T-piece which cooperate with slots in the form of an inverted T-piece created in the vertical wing of the side pieces so as to automatically lock each fixing shell in the horizontal position relative to said vertical wing after it engages in this latter.

The invention also relates to the palletizer comprising a palletization deck in form of a trap door for placing onto a pallet, in successive layers, various products and/or packages, which trap door is constituted by two parts which are guided in a frame which is itself vertically mobile, and these two parts of said trap door are themselves also mobile relative to each other, opening symmetrically above the pallet to permit the release of each layer of products onto said pallet, one of said parts of said trap door, called the large part of the trap door, serves as a reception surface for said layer of products and it has a surface area at least equal to the overall surface occupied by this layer to be palletized, the other part of said trap door, called the small part of the trap door, has a surface area of the order of half that of the large part of the trap door to receive, before its' placement, half of said layer to be palletized, said large part of the trap door, at least, being constituted by a deck as detailed previously.

Still according to the invention, the small part of the trap door of the palletizer can be arranged like the large part of the trap door, with rollers, except that these rollers do not comprise (a) free wheel(s).

BRIEF DESCRIPTION OF THE DRAWINGS

But the invention will also be detailed using the following description and the attached drawings given by way of indication and in which:

FIG. 1 shows, schematically, the different elements constituting a palletization installation, and in particular a palletizer of the type comprising a palletization deck with symmetrical opening;

FIG. 2 shows a cross section of the large part of the trap door of the palletization deck, produced with a tubular component in the form of a roller;

FIG. 3 shows, in perspective, the right-hand corner of the entrance to the large part of the trap door of the palletization deck;

FIG. 4 shows, also in perspective, the detail of the specific mounting of the free wheel which allows the rotation of the roller in one direction and the blocking of it in the other direction, so as to also use it as a non-return component for the products and/or packages, during movement of the deck between its position receiving said products and its position allowing the release of the latter above the pallet.

DETAILED DESCRIPTION OF THE INVENTION

The palletization installation represented in FIG. 1 comprises a conveyor (1) delivering products (2), and/or packages, to be palletized, which products, of bottle pack type for example, are in the form of parallelepipedic boxes.

The conveyor (1) transfers the products (2) onto the deck (3) of roller type, which is a deck for the preparation of said products (2), i.e. a deck where the products are installed lengthwise or crosswise according to criteria linked to their dimensions and those of the pallet and, in particular, to the palletization scheme.

Transfer means, not represented, push onto the grouping table (4) the lines of products (2) which have been prepared on the deck (3) and, when the layer of products is ready, the latter is transferred by a pusher, not represented, onto the palletization deck (5).

This palletization deck (5), represented in simplified fashion in FIG. 1, is constituted by two parts in the form of traps, with symmetrical opening; it comprises a large part of the trap door (6) and a small part of the trap door (7); the surface area of this trap door (7) corresponds to half that of said large part of the trap door (6).

This large part of the trap door (6) itself has a surface area which corresponds to that of the grouping table (4), i.e. to the surface occupied by the layer to be palletized, which surface corresponds to the surface area of the pallet which this layer will receive.

The two parts of the trap door will, in the remainder of the text, be called decks with the reference numbers (6), (7), depending on whether it is the large or the small part of the trap door respectively that is concerned.

These decks (6) and (7) are carried by a frame (9) which is vertically mobile between a position where it takes control of the layer of products (2) at the grouping table (4) and positions of placing this layer onto the pallet (10), said positions being adapted to the lifting level.

The frame (9) is guided on vertical beams (11), and is manoeuvred by appropriate means in order to move vertically.

The two decks (6) and (7) are themselves also guided on the frame (9) in order to move away from or towards each other simultaneously by means of a chain drive system (12) which is illustrated in FIG. 1.

The two decks (6) and (7) approach each other in order that the layer which is arranged on the large deck (6) can be transferred in part onto the small deck (7) by means of a suitable pusher, not represented, installed on the frame (9), and they move away from each other then withdraw, vertically to the pallet (10), in order to release said layer onto said pallet (10).

Before this release, the layer is encircled using presses, not represented, which form a sort of holding and guiding frame, for all of the release time, i.e. the time for the withdrawal of the palletization deck and in particular of the withdrawal the two decks (6) and (7), opening the release window (15).

The pallet (10) is situated under the window (15) which is delimited by the two large sides of the frame (9) and the inner edges opposite the two decks (6) and (7), which form the downstream crosspieces of said decks.

This pallet (10) travels on a conveyor (13) where it is placed to await loading, then removed.

The transfer of the layer of products between the grouping table (4) and the palletization deck (5) must take place without disturbing the layer, i.e. retaining the arrangement and the orientation of the products as established at the preparation table (3) in a first step then at the grouping table (4) in a second step.

To reconcile the different requirements which obtain at this palletization deck (5), the structure acting as a chassis for the decks (6) and (7) and in particular that of the large deck (6) is constituted by a frame (20) set up to facilitate the installation of a base which can be related to the type of products and/or packages to be palletized.

The deck (6) is constituted by two side pieces (21) and two crosspieces: an upstream crosspiece (22) situated at the entrance and a downstream crosspiece (23) situated at the exit, at the release zone.

The side pieces (21) comprise arrangements appropriate for cooperating with the frame (9), of the slide rail type, not represented. These side pieces (21) have, as represented in FIGS. 1 to 4, and over their whole length, a square section, and form a rebate for receiving a base adapted to the types of products (2) to be palletized.

The upstream crosspiece (22) situated at the entrance to the palletization deck (6) has a section in the shape of an inverted U the wings of which are of unequal lengths. The lower wing (24) is longer than the upper wing (25); this wing (24) acts as a stiffener, while the upper, shorter, wing (25) acts as a sliding surface at the entrance to the deck (6).

The downstream crosspiece (23) situated at the exit from the deck (6) is in the form of a sheet or a profile, the dimension of which, in the longitudinal direction of said deck (6), is chosen so as to act as a brake and stop for the products when the complete layer is transferred from the grouping table (4).

The thickness of this crosspiece (23) is relatively small in order to limit the drop height of the products to be palletized when they are released onto the pallet (10).

The actual base (26) is found between the two crosspieces (22) and (23); this base (26) is as thin as possible, of the order of approximately 3 cm, like the downstream crosspiece (23).

The upper wing (25) of the upstream crosspiece (22) is situated at a level which is situated substantially above the level of that of the base (26). This wing (25) acts as a stop and a non-return heel piece for the products when the deck (6) is set in motion in order to bring said products above the release zone.

The base (26) is constituted by tubular components (27) of small diameter, in the form of rollers (28), as detailed in FIG. 2 in particular.

The upper surface of the crosspiece (23) and the plane of circulation on the rollers (28) are at the same level whereas, as stated previously, the upper wing (25) of the upstream crosspiece (22) is situated slightly above this level in order to act as a stop and non-return heel piece.

As detailed in FIG. 2, the rollers (28) are constituted by a tube (29) the outer diameter of which is of the order of 30 mm and the length of which substantially corresponds to that of the pallet (10); this length is of the order of approximately 1.2 m. These rollers (28) are very close together, almost nose to tail, in order to offer a good resistance taking account of the load.

The tube (29) is a rigid tube, of the cold-drawn type, without welding, with a diameter of 30 mm and a thickness of 3 mm. It comprises a half-shaft (30), (31) at each of its ends which is welded.

The half-shaft (30) comprises a bearing (32) which is axially immobilized by means of a screw (33) whereas the half-shaft (31) comprises a bearing (34) which is mounted axially free.

The horizontal wing (40), situated in the lower part of the side pieces (21), contains cut-outs (41) which are shown in FIGS. 2 to 4; these cut-outs (41) allow the bearings (32) and (34) to be housed and in particular a portion of the lower part of the outer cage of said bearings to be wedged; this position of the bearings (32) and (34) on the wing (40) of the rebate of the side pieces (21) allows the rollers (28) to be placed as low as possible relative to the lower part of said side pieces (21), practically at the same level, which generally reduces the thickness of the palletization deck (6).

The wing (40) of the side pieces (21) constitutes the lower part of the mounting which allows the bearings (32) and (34) to be fixed. This mounting comprises, on each side of the deck (6), at the end of the rollers (28), a piece (42) which is situated above the end of the half-shafts (30), (31), and which is parallel to the wing (40) of each side piece (21). This piece (42) forms a sort of locking shell which covers the upper part of the bearings (32) and (34). It comprises cut-outs (43) which are identical to the cut-outs (41) of the wing (40).

These cut-outs (41) and (43) are arranged in opposition vertically and they form a true housing for each bearing (32), (34).

The pieces or shells (42) are cut out from sheet metal having a thickness of the order of 3 mm; their length is limited in order to cooperate with, for example, four bearings. This particular feature makes it possible to facilitate the mounting of the rollers (28) and also to have convenient access to these rollers (28) with a view to intervening if needed.

Each shell (42) therefore contains four cut-outs (43); they also contain two orifices (44) which are situated above and opposite the orifices (45) of the wing (40), for the passage of screws (46). These screws (46) are situated between each pair of rollers (28); they have, for example, a round head atop a square which allows them to be locked in the orifice (44) of equivalent shape situated on each shell (42).

These shells (42) comprise tabs (47) in the form of a T-piece which allow them to be fastened to the vertical wing (48) of the side pieces (21). These wings (48) comprise cut-outs (49) in form of an inverted T-piece which receive the tabs (47) of the shells (42). The tabs (47) and the cut-outs (49) are shaped and arranged so as to place the shells (42) parallel to the lower wing (40) of the side pieces (21).

The rollers (28) do not necessarily occupy the whole of the surface of the base (26); they can be replaced by what are generally called the tubular components (27), the function of which, apart from the fact that they also constitute the base (26), can be to act as a brake to slow down, or even stop, the products when they are introduced onto the palletization deck (6).

FIG. 2 also shows the possibility of replacing the bearing (32) with a simple ring (52) in order to have available a fixed tubular organ (27) which can act as a brake for the passing products.

This ring (52) is in one piece, with the same dimensions as the bearing (32) which it replaces. It is immobilized on the half-shaft (30) by the screw (33) and it is locked, by clamping, in the mounting constituted by the wing (40) and the shell (42), and in particular in their respective cut-outs (41) and (43).

The rollers (28) can also, as represented in FIGS. 2 and 4, comprise arrangements to the half-shaft (31) which allow them to behave as anti-return heel pieces.

They can comprise, at the end of the half-shafts (31), journals (51) able to receive the free wheels (53) the role of which is to allow the rotation of the rollers (28) in one direction and block them in the other direction; this particular feature allows said rollers (28) equipped in this way to retain the products (2) which are on the deck (6) when said deck (6) is set in motion in order to place said products (2) in the release position above the pallet (10).

The free wheel (53) is in the form of a ring of small thickness, the outer cage of which is force-fitted into the central orifice of a square acting as a wedge (54). This wedge (54) is positioned in the mounting constituted by the lower wing (40) of the side piece (21) and by the shell (42), between said wing (40) and said shell (42).

In FIG. 4, one of the tubular components (27) acting as a roller comprises a free wheel (53) which cooperates with a wedge (54). These rollers (28) equipped with free wheels (53) are situated on all or part of the base (26) starting from the crosspiece (22).

Deck (6) and deck (7) can be configured in the same way but the rollers (28) with a free wheel (53) are intended for deck (6).

The invention claimed is:

1. A palletization deck for placing a layer of products onto a pallet, which deck comprises a base of small thickness which is carried on a frame delimited by crosspieces also of small thickness and by side pieces,
   wherein said side pieces have a square-shaped section the horizontal wing of which at least of the rebate is arranged to receive and allow locking of a piece of equipment forming said base and which is adapted to the nature of the products constituting the layer to be palletized, which piece of equipment is in the form of tubular components of small diameter, of the order of 30 mm, arranged between and parallel to said crosspieces, said components configured to comprise rollers which, in all or part, are mounted on free wheels; and
   wherein the tubular components comprise a tube the length of which corresponds at least to that of the pallet, which tube comprises, at each end, a half-shaft which is fitted with a bearing mechanism able to be set and immobilized in housings which are created in a mounting, which mounting comprises the lower horizontal wing of the rebate of the side pieces and at least one locking shell which is fixed to said corresponding side piece and which is common to several tubular components, forming groups of components, each housing comprising two superimposed slots, one being arranged in said wing and the other in said locking shell, to receive an outer cage of bearings.

2. The palletization deck according to claim 1, wherein an entry one of the crosspieces comprises a U-shaped structure with asymmetrical wings which are arranged horizontally, the upper wing projecting slightly above the level of the base in order to act as a stop and non-return heel piece.

3. The palletization deck according to claim 1, wherein an exit one of the crosspieces comprises a sheet the nature and the longitudinal dimension of which are chosen, on the one hand to brake and retain the products during their introduction and also, on the other hand, to position the products correctly before release of the products onto the pallet.

4. The palletization deck according to claim 1, wherein the rollers comprise a bearing at each of their ends, one of said bearings being immobilized on its half-shaft and the other being axially free on its half-shaft, and this latter half-shaft comprises a journal at its end arranged to receive a free wheel of small diameter, which free wheel comprises an outer cage which is immobilized in the mounting of the bearings.

5. The palletization deck according to claim 4, wherein the free wheel comprises the outer cage immobilized in the mounting of the bearings by a wedge force-fitted onto the outer cage of the free wheel.

6. The palletization deck according to claim 1, wherein the tubular components act as retention mechanism to brake the products, which components comprise, instead and in place of the bearing which is immobilized on its half-shaft, a ring which is clamped and immobilized on said half-shaft, which ring is locked in the housing of the mounting normally allocated to said bearing.

7. The palletization deck according to claim 1, wherein the locking shells of the bearings comprise a plate provided, on the side of the vertical wing of the side piece, with tabs which fit into cut-outs created in said vertical wing, and fitted with orifices for the passage of machine screws of round-head type with a square under said head.

8. The palletization deck according to claim 7, wherein the locking shells comprise tabs in the form of a T-piece which cooperate with cut-outs in the form of an inverted T-piece, created in the vertical wing of the side pieces so as to automatically lock each shell relative to said vertical wing after engaging therein.

9. The palletization deck according to claim 1, wherein the tubular components are configured to brake the products and comprise a ring clamped and immobilized on said half-shaft, the ring is locked in the housing of the mounting.

10. A palletizer comprising a deck in the form of a trap door with symmetrical opening for the placing onto a pallet and in successive layers, of various products and/or packages, which trap door comprises two parts which are guided in a frame which is vertically mobile, and the two parts are symmetrically mobile relative to each other on either side of the vertical plane of symmetry of said pallet, so as to release each layer of products onto the latter, one of the parts, called the large deck, having a surface area at least equal to the space occupied by the layer of products to be palletized, the other part, called the small deck, having a surface area of the order of half that of said large deck for receiving before placement, said large deck comprises a base of small thickness which is carried on a frame delimited by crosspieces also of small thickness and by side pieces, said side pieces have a square-shaped section the horizontal wing of which at least of the rebate is arranged to receive and allow locking of a piece of equipment forming said base and which is adapted to the nature of the products constituting the layer to be palletized, which piece of equipment is in the form of tubular components of small diameter, of the order of 30 mm, arranged between and parallel to said crosspieces, said components configured to comprise rollers, an entry one of the crosspieces comprises a U-shaped structure with asymmetrical wings which are arranged horizontally, the upper wing projecting slightly above the level of the base in order to act as a stop and non-return heel piece, and an exit one of the crosspieces comprises a sheet the nature and the longitudinal dimension of which are chosen, on the one hand to brake and retain the products during their introduction and also, on the other hand, to position them correctly before their release onto the pallet.

11. The palletizer according to claim 10, wherein the tubular components comprise a tube the length of which corresponds at least to that of the pallet, which tube comprises, at each end, a half-shaft, which is fitted with a bearing mechanism, able to be set and immobilized in housings which are created in a mounting, which mounting comprises the lower horizontal wing of the rebate of the side pieces and at least one locking shell which is fixed to said corresponding side piece and which is common to several tubular components, forming groups of components, each housing comprising two superimposed slots, one being arranged in said wing and the other in said locking shell, to receive an outer cage of bearings, and wherein the locking shells of the bearings comprise a plate provided, on the side of the vertical wing of the side piece, with tabs which fit into cut-outs created in said vertical wing, and fitted with orifices for the passage of machine screws of round-head type with a square under said head, and wherein said locking shells comprise tabs in the form of a T-piece which cooperate with cut-outs in the form of an inverted T-piece, created in the vertical wing of the side pieces so as to automatically lock each shell relative to said vertical wing after engaging therein.

12. The palletizer according to claim 10, wherein the rollers comprise a bearing at each of their ends, one of said bearings being immobilized on a respective half-shaft and the other being axially free on second respective half-shaft, and the second half-shaft comprises a journal at an end arranged to receive a free wheel of small diameter, which free wheel comprises an outer cage which is immobilized in the mounting of the bearings, and wherein the locking shells of the bearings comprise a plate provided, on the side of the vertical wing of the side piece, with tabs which fit into cut-outs created in said vertical wing, and fitted with orifices for the passage of machine screws of round-head type with a square under said head, and wherein the locking shells comprise tabs in the form of a T-piece which cooperate with cut-outs in the form of an inverted T-piece, created in the vertical wing of the side pieces so as to automatically lock each shell relative to said vertical wing after engaging therein.

13. The palletizer according to claim 12, wherein the free wheel comprises the outer cage immobilized in the mounting of the bearings by a wedge force-fitted onto the outer cage of the free wheel.

14. The palletizer according to claim 10, wherein the tubular components act as retention means to brake the products, which components comprise, instead and in place of the bearing which is immobilized on a respective half-shaft, a ring which is clamped and immobilized on said half-shaft, which ring is locked in the housing of the mounting normally allocated to said bearing, and wherein the locking shells of the bearings or rings comprise a plate provided, on the side of the vertical wing of the side piece, with tabs which fit into cut-outs created in said vertical wing, and fitted with orifices for the passage of machine screws of round-head type with a square under said head, and wherein the locking shells comprise tabs in the form of a T-piece which cooperate with cut-outs in the form of an inverted T-piece, created in the vertical wing of the side pieces so as to automatically lock each shell relative to said vertical wing after engaging therein.

15. The palletizer comprising a deck in the form of a trap door with symmetrical opening for the placing onto a pallet and in successive layers, of various products and/or packages, which trap door comprises two parts which are guided in a frame which is vertically mobile, and the two parts are symmetrically mobile relative to each other on either side of the vertical plane of symmetry of said pallet, so as to release each layer of products onto the latter, one of the parts, called the large deck, having a surface area at least equal to the space occupied by the layer of products to be palletized, the other part, called the small deck, having a surface area of the order of half that of said large deck for receiving before placement, said small deck comprising a base of small thickness which is carried on a frame delimited by crosspieces also of small thickness and by side pieces, said side pieces have a square-shaped section the horizontal wing of which at least of the rebate is arranged to receive and allow locking of a piece of equipment forming said base and which is adapted to the nature of the products constituting the layer to be palletized, which piece of equipment is in the form of tubular components of small diameter, of the order of 30 mm, arranged between and parallel to said crosspieces, said components configured to comprise rollers; and wherein the tubular components comprise a tube the length of which corresponds at least to that of the pallet, which tube comprises, at each end, a half-shaft which is fitted with means of the bearing type able to be set and immobilized in housings which are created in a mounting, which mounting comprises the lower horizontal wing of the rebate of the side pieces and at least one locking shell which is fixed to said corresponding side piece and which is common to several tubular components, forming groups of components, each housing comprising two superimposed slots, one being arranged in said wing and the other in said locking shell, to receive an outer cage of bearings, and wherein the locking shells of the bearings comprise a plate provided, on the side of the vertical wing of the side piece, with tabs which fit into cut-outs created in said vertical wing, and fitted with orifices for the passage of machine screws of round-head type with a square under said head, and wherein the locking shells comprise tabs in the form of a T-piece which cooperate with cut-outs in the form of an inverted T-piece, created in the vertical wing of the side pieces so as to automatically lock each shell relative to said vertical wing after engaging therein.

16. A palletizer comprising a deck in the form of a trap door with symmetrical opening for the placing onto a pallet and in successive layers, of various products and/or packages, which trap door comprises two parts which are guided in a frame which is vertically mobile, and the two parts are symmetrically mobile relative to each other on either side of the vertical plane of symmetry of said pallet, so as to release each layer of products onto the latter, one of the parts, called the large deck, having a surface area at least equal to the space occupied by the layer of products to be palletized, the other part, called the small deck, having a surface area of the order of half that of said large deck for receiving before placement, said small deck comprises a base of small thickness which is carried on a frame delimited by crosspieces also of small thickness and by side pieces, said side pieces have a square-shaped section the horizontal wing of which at least of the rebate is arranged to receive and allow locking of a piece of equipment forming said base and which is adapted to the nature of the products constituting the layer to be palletized, which piece of equipment is in the form of tubular components of small diameter, of the order of 30 mm, arranged between and parallel to said crosspieces, said components configured to comprise rollers; and wherein the tubular components act as retention mechanism to brake the products, which components comprise, instead and in place of the bearing which is immobilized on its half-shaft, a ring which is clamped and immobilized on said half-shaft, which ring is locked in the housing of the mounting normally allocated to said bearing, and wherein the locking shells of the bearings or rings comprise a plate provided, on the side of the vertical wing of the side piece, with tabs which fit into cut-outs created in said vertical wing, and fitted with orifices for the passage of machine screws of round-head type with a square under said head, and wherein the locking shells comprise tabs in the form of a T-piece which cooperate with cut-outs in the form of an inverted T-piece, created in the vertical wing of the side pieces so as to automatically lock each shell relative to said vertical wing after engaging therein.

* * * * *